United States Patent [19]

Bateman

[11] Patent Number: 4,629,381
[45] Date of Patent: Dec. 16, 1986

[54] TAMPER-PROOF RIVET ASSEMBLY
[75] Inventor: Victor E. Bateman, Crawley, United Kingdom
[73] Assignee: Burroughs Corporation, Detroit, Mich.
[21] Appl. No.: 709,944
[22] Filed: Mar. 8, 1985
[30] Foreign Application Priority Data
Mar. 13, 1984 [GB] United Kingdom ............... 8406481
[51] Int. Cl.⁴ ............................................. F16B 13/04
[52] U.S. Cl. ..................................... 411/34; 411/84; 411/910
[58] Field of Search .................................. 411/34–38, 411/43, 84, 85, 103, 107, 443, 444, 372, 533, 910, 966; 206/343–347; 109/25

[56] References Cited
U.S. PATENT DOCUMENTS
2,341,829  2/1944  Tinnerman ........................ 411/84
2,421,201  5/1947  Hallock ........................... 411/84
3,938,657  2/1976  David ............................. 206/343

Primary Examiner—Gary L. Smith
Assistant Examiner—Neill Wilson
Attorney, Agent, or Firm—Mark T. Starr; Kevin R. Peterson

[57] ABSTRACT

A tamper proof pop rivet assembly comprises a base plate having base plate holes of a greater diameter than that of the barrel of a pop rivet and of a greater diameter than that of the flange of the pop rivet and further comprises a top plate having top plate holes of a greater diameter than that of the traction pin of the pop rivet and of a lesser diameter than that of the barrel of the pop rivet. The top plate is spot welded to the base plate to sandwich the flange of a pop rivet therebetween. The assembly can be used as a replacement for a conventional pop rivet assembly and shows visible signs of any attempt at drilling-out or replacing the pop rivet.

19 Claims, 16 Drawing Figures

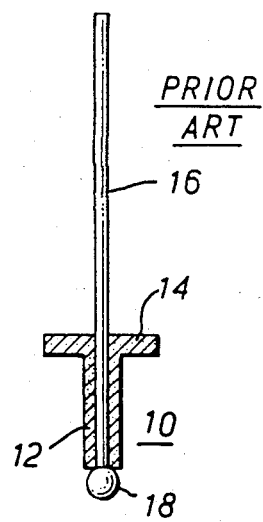
FIG.IA
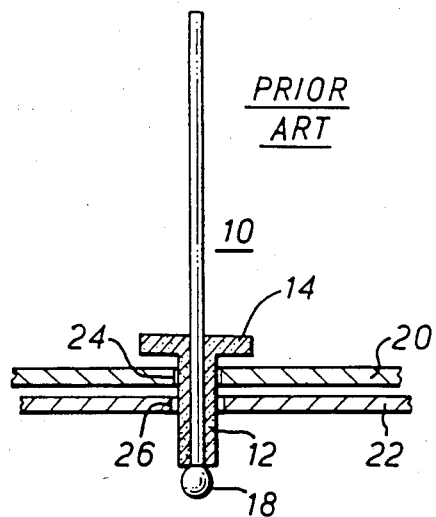
FIG.IB
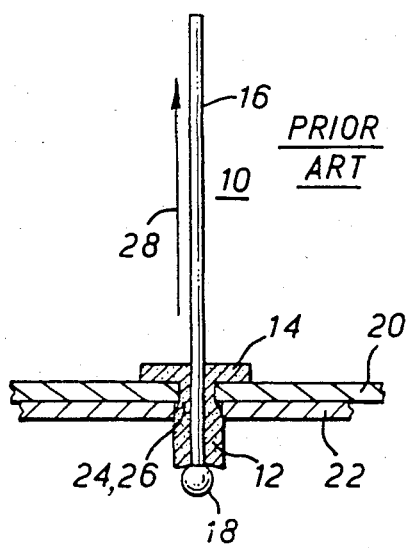
FIG.IC
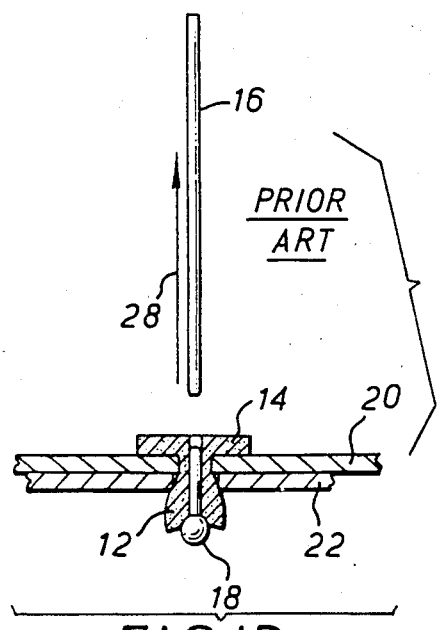
FIG.ID

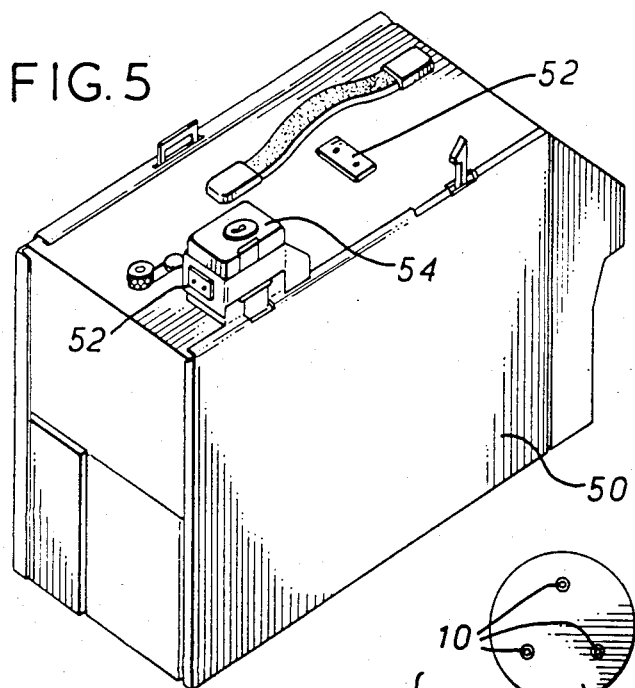
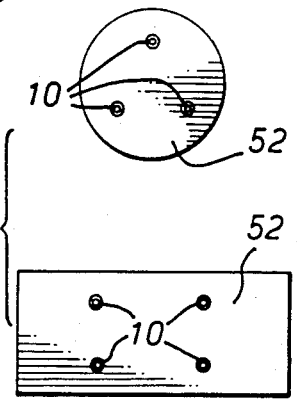
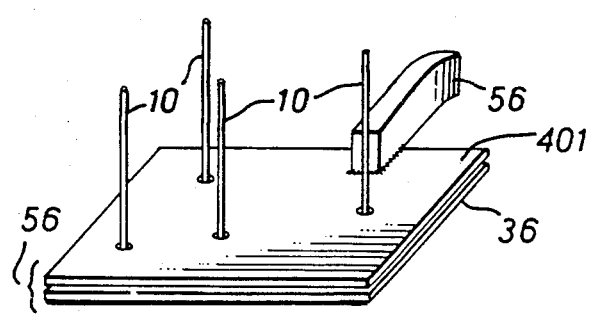

4,629,381

TAMPER-PROOF RIVET ASSEMBLY

BACKGROUND OF THE INVENTION

1. The Field of the Invention

The present invention relates to POP rivets. More particularly, the present invention relates to POP rivets used in the assembly of cash boxes and other secure enclosures. Most particularly, the present invention relates to a POP rivet assembly which cannot be tampered with without leaving traces of that tampering.

2. The Prior Art

Pop riveting represents a cheap and effective way of assembling light sheet fabrications. A POP rivet is inserted through a pair of aligned holes in an abutting pair of metal sheets and deformed to hold the sheets together. Pop riveting is particularly attractive in those situations where spot welding is impractical either because of low volume of production, precluding the expenditure required upon jigs and special welding heads; or because of inaccessibility of welding heads to the point of attachment. Further, spot welding can cause unwanted fusion between parts which are not to be welded.

Light steel boxes are commonly used as banknote cassettes in autotellers money to bank customers after normal banking hours upon presentation to the autoteller of a valid card by a customer. The autotellers operate over weekends and public holidays when banking staff are not in attendance. It is the custom, therefore, to provide for a third party, such as a security firm, to load the autoteller with fresh supplies of banknotes whenever required. The bank notes are provided in a cassette, pre-loaded in the bank and presented to the security firm for later loading. The cassette generally holds up to one hundred thousand dollars and is fabricated from mild steel including locks and other security devices. Pop rivet construction for such a box would be desirable, but is generally precluded because of the vulnerability of POP rivets to undetectable removal and replacement. The POP rivets can be drilled out, the box opened, some of the contents removed, and the POP rivet replaced. An undetectable opening of the box is thus accomplished and it cannot be proved at what stage the money which is missing has gone missing. The non-availability of POP riveting as a method for assembling cash boxes for autotellers has meant that this low production item has previously been fabricated in more expensive ways more suitable to high volume production.

It is, therefore, desirable to provide a POP rivet assembly which cannot be tampered with without leaving signs of that tampering. This would bring POP riveting into the same class of security as other methods of construction.

SUMMARY OF THE INVENTION

While the present invention is hereinbefore and hereinafter described with reference to using a POP rivet assembly on a banknote cassette for an autoteller, this use is purely illustrative of the invention and the assembly as hereinafter described can equally be used in any location wherein a POP rivet could be employed.

A POP rivet is hereinafter defined as a device for attaching first and second plates together by introduction into and expansion in first and second aligned holes respectively through-penetrative of said first and second plates, said POP rivet comprising a cylindrical barrel for passage through said aligned holes, a flange at a first extremity of said barrel for engaging said first plate to prevent further passage of said barrel through said aligned holes, and a traction pin axially through-penetrative of said barrel and comprising a head in external abutment with a second extremity of said barrel, where said traction pin is extractable from said barrel for said head to engage with and deform said barrel at said second extremity for said second extremity of said barrel to exceed the dimensions of said second aligned hole to engage said second plate and for said flange to engage said first plate to draw and hold together said first and second plates, said traction pin being fracturable within said barrel upon application thereto of excess extraction force.

The present invention consists in a POP rivet assembly comprising; a POP rivet; a base plate comprising a base plate hole having a greater diameter than that of the barrel of said POP rivet and a lesser diameter than the flange of said POP rivet for accepting the through passage of said barrel of said POP rivet for said flange to abut said base plate with an inserted portion of said barrel protuberant from said base plate; and a top plate comprising a top plate hole having a lesser diameter than that of said barrel and a greater diameter than that of the traction pin of said POP rivet for the passage therethrough of said traction pin for said top plate to abut said base plate with said flange intermediate therebetween, said top plate thereafter being affixable to said base plate; where said assembly is operable to attach together first and second plates by the introduction of said protuberant portion of said barrel through first and second aligned holes respectively through-penetrative of said first and second plates and by the subsequent extraction and fracture of said traction pin through said top plate hole.

BRIEF DESCRIPTION OF THE PREFERRED EMBODIMENT

In a preferred embodiment, a top plate is provided with top plate holes through which the traction pins of a pair of POP rivets may pass, but not the barrel. The assembly also includes a base plate having a pair of base plate holes in alignment with the top plate holes through which the barrel of each of the pair of POP rivets may pass, but not the flange. The POP rivets are inserted with their barrels protruding through the base plate holes and the top plate is slid over the traction pins of the POP rivets to engage the base plate. Thereafter, the top plate and the base plate are spot welded together. The whole assembly can then be used as if it were a POP rivet, the protruding parts of the barrel of the POP rivets beneath the base plate being passed through aligned pairs of holes in plates to be attached onto the other and the traction pins of each of the POP rivets being extracted and fractured.

BRIEF DESCRIPTION OF THE DRAWINGS

The invention is further described, by way of an example, by the following description in conjunction with the appended drawings in which:

FIGS. 1A to 1D show the construction and use of a POP rivet according to the prior art.

FIG. 5 shows examples of the POP rivet assembly in use on a secure autoteller banknote cassette.

FIG. 6 shows alternative symmetrical configurations for the POP rivet assembly according to the present invention.

FIG. 7 shows an unsymmetrical array of POP rivet locations according to the present invention whereby the POP rivet assembly can only be used in a predetermined orientation for a component mounted on the top plate to be brought into its correct position of use.

DETAILED DESCRIPTION OF THE PREFERRED EMBODIMENT

Figure 2A:
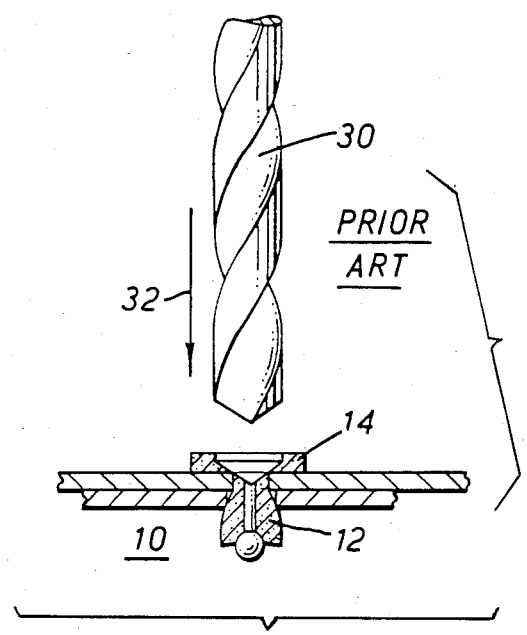
FIGS. 2A and 2B show the manner in which a prior art POP rivet may be undetectably removed for later undetectable replacement, thus rendering the prior art POP rivet shown in FIGS. 1A to 1D unsuitable for secure construction.

Attention is first drawn to FIG. 1A. A POP rivet 10 comprises a barrel 12 with a flange 14 at a first end. The barrel 12 is in the form of a right circular cylinder and the flange 14 is also circular. It will be clear from the following description that shapes other than circularly symmetric shapes can be used for POP rivets.

A steel traction pin 16 passes through the barrel 12 and has a head 18 in contact with the end of the barrel 12 remote from the flange 14. The barrel 12 and the flange 14 are made of a soft malleable metal.

Attention is next drawn to FIG. 1B, showing how the POP rivet 10 of FIG. 1A is employed to join together a first plate 20 and a second plate 22. The first plate 20 includes a first hole 24 of a greater diameter than the barrel 12 but of a lesser diameter than the flange 14. Similarly, the second plate 22 includes a second hole 26 also of a greater diameter than that of the barrel 12, but of a lesser diameter than that of the flange 14. The POP rivet 10 is inserted with its barrel 12 through the aligned first and second holes 24,26 so that the flange rests on the first plate 20. The barrel protrudes beneath the second plate 22.

FIG. 1C shows a second stage in the operation of the POP rivet 10 of FIG. 1A. The traction pin 16 is drawn from the barrel 12 by means of a tool, which bears the flange 14 in the direction of a first arrow 28. The head 18 of the traction pin 16 causes the deformation of the barrel 12. This has the effect of drawing the second plate 22 towards the first plate 20 and of causing the barrel to increase its diameter to fill both the first and second holes 24,26 and to exceed the diameter of the second hole 26 to provide a deformed slug for maintaining the first and second plates 20,22 first one against the other.

FIG. 1D shows the third and last stage of use of the prior art POP rivet shown in FIG. 1A. Increased traction of the traction pin 16 in the direction of the first arrow 28 causes the traction pin 16 to fracture in the barrel 12 beneath the level of the flange 14. The head 18 of the traction pin 16 remains embedded in the deformed portion of the barrel 12 together with part of the traction pin 16. The residual portion of the traction pin 16 in the barrel adds to the strength of the POP riveted joint.

FIG. 2A shows how a prior art POP rivet fixed according to FIG. 1D may be removed without detection. A simple twist drill 30 having a diameter greater than that of the barrel 12 is simply axially presented to the POP rivet 10 in the direction of a second arrow 32. A hand drill is all that is required. The soft metal of the POP rivet 10 can readily be drilled to detach a residual portion of the flange 14 from the deformed barrel 12.

Figure 2B:
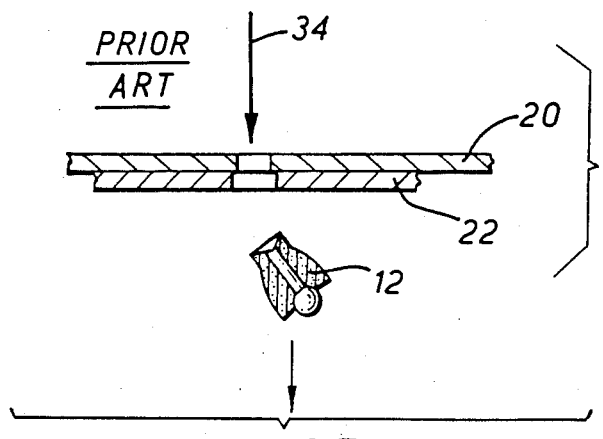

FIG. 2B shows the last stage of undetectable removal of a POP rivet 10 according to FIG. 1B. Having drilled out the POP rivet 10 and having removed the residual portion of the collar 14 it is merely necessary to apply a punch as indicated by a third arrow 34 to cause the deformed portion of barrel 12 to fall from between the first and second plates 20,22. After disassembly a fresh POP rivet can be installed as shown in FIGS. 1B to 1D. The fresh POP rivet will hide any damage which may have been done by the drill 32 to the first plate 20 during removal of the POP rivet 10. It is, therefore, very difficult to detect when a secure container has been so disassembled and thereafter reassembled.

Figure 3A:
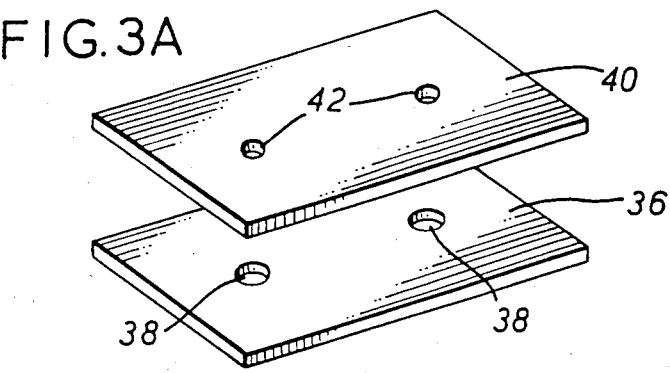
FIGS. 3A to 3C show a POP rivet assembly according to the present invention.

FIG. 3A shows part of a POP rivet assembly according to the present invention. A steel base plate 36 is provided with a spaced pair of base plate holes 38. A steel top plate 40 is provided with a similarly spaced pair of top plate holes 42.

Figure 3B:
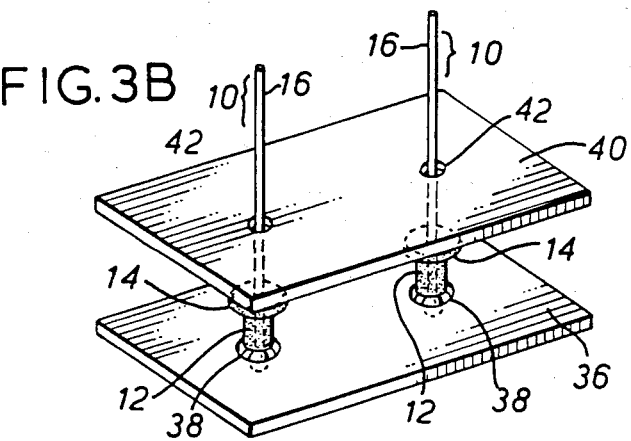

FIG. 3b shows an exploded view of all of the elements required in the POP rivet assembly according to the present invention. A pair of POP rivets 10 is provided. The traction pins 16 of the POP rivets 10 pass through the top plate holes 42 in the top plate 40. The top plate holes 42 are of sufficient diameter to allow the through passage of the traction pin 16, but too small to permit the insertion therein of the barrels 12 of the POP rivets 10. The barrels 12 of the POP rivets 10 pass through the base plate holes 38 in the base plate 36. The base plate holes 38 are of sufficient diameter to allow the through passage of the barrels 12 but too small to allow the through passage of the flanges 14. The flanges 14 thus become trapped between the top plate 40 and the base plate 36.

Figure 3C:
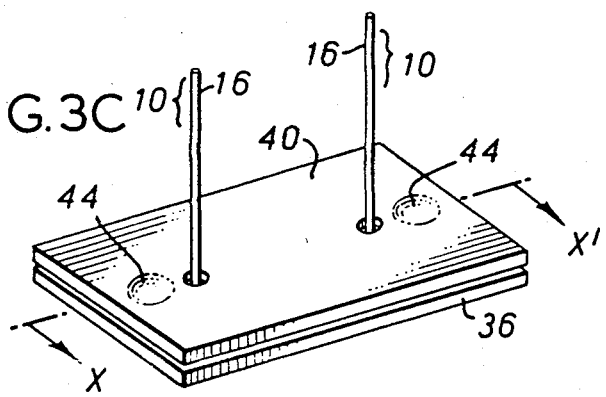

FIG. 3C shows the completed assembly of FIG. 3B. The top plate 40 is brought into engagement with the base plate 36 and the base plate 36 is welded to the top plate 40 by means of spot welds 44. While two spot welds have here been shown it is to be appreciated that the spot welds may be three or more in number and may be differently disposed in relation to the POP rivets 10 from the disposition shown in FIG. 3C.

Figure 4A:
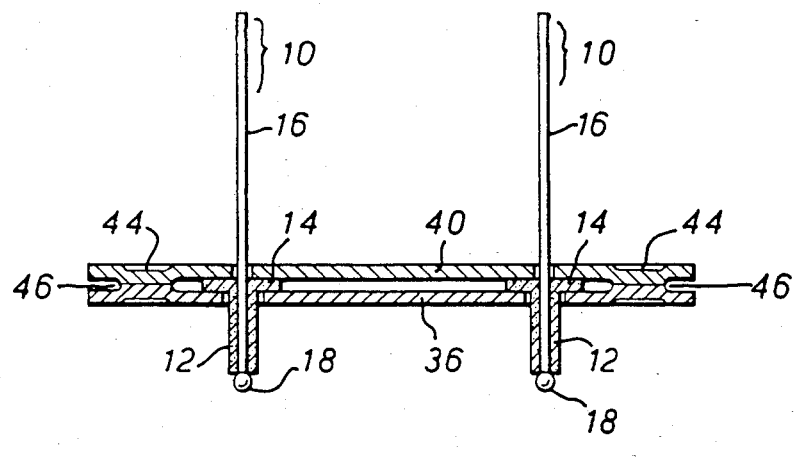
FIGS. 4A to 4D show in cross section the construction and use of the POP rivet assembly according to the present invention.

FIG. 4A shows a cross-sectional view of the complete assembly of FIG. 3C taken along the dotted line X-X' looking in the direction of the arrows. The top plate 40 and the base plate 36 may singly or together be provided with bosses 46 for spacing them apart in order to accommodate the flanges 14. The bosses 46 then become a convenient point of spot welding. As an alternative, one the other or both of the top plate 40 and the base plate 36 may be made flexible so that they may be forced together about the flanges 14 and spot welded by compression between a pair of spot welding electrodes.

A portion of the barrels 12 protrude beneath the base plate 36. While the POP rivets 10 shown in FIG. 4A conform in general outline to the POP rivet shown in FIG. 1A, it is to be appreciated that in order to accommodate the thickness of the base plate 36 it may be necessary to select the length of the barrel 12 to be greater than previously used in the prior art.

Figure 4B:
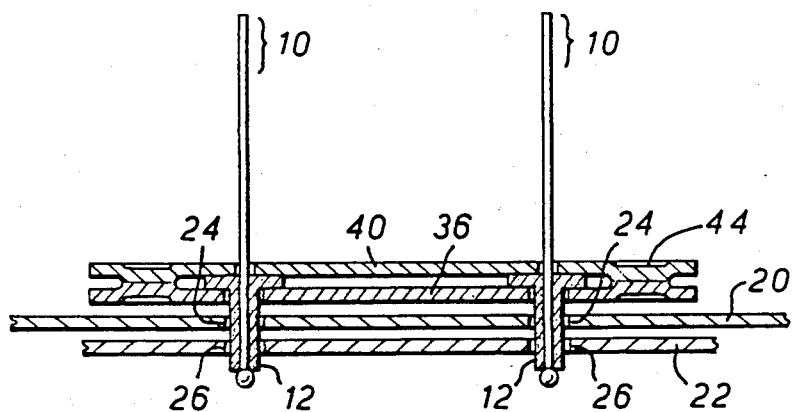

FIG. 4B shows the first stage in employing the completed assembly of FIG. 4A for affixing first and second plates 20,22 together. The completed assembly shown in FIG. 4A is robust and can be transported without disintigration to the first and second plates 20,22. As before, the first and second plates comprise aligned first and second holes 24,26 in two pairs spaced as for the POP rivets 10. The protruding portions of the barrels 12 are inserted through the aligned pairs of holes 24,26 to protrude below the second plate 22.

Figure 4C:
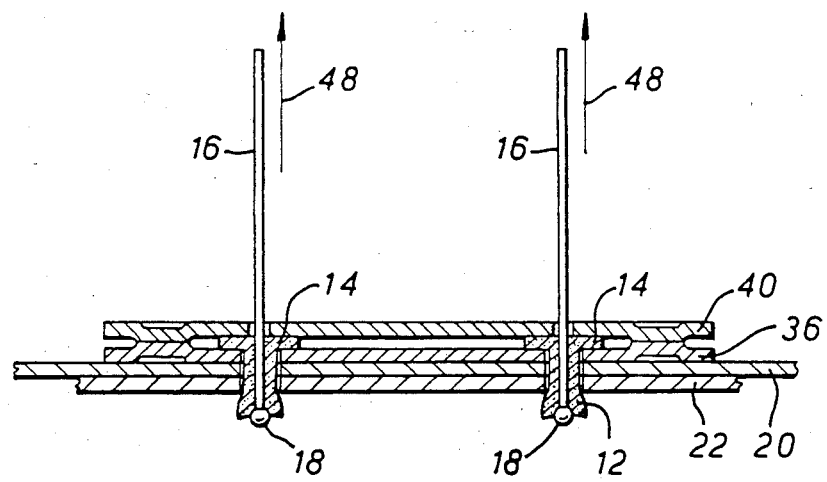

FIG. 4C shows the second stage in the use of an assembly according to the present invention. The base plate 36 rests against the top plate 20. The flange 14 rests against the base plate 36. The traction pins 16 are extracted as indicated by fourth arrows 48 by a tool which, instead of bearing against the flange 14, bears against the top plate 40. The head 18 of the traction pin 16 deforms the protruding portion of the barrel 12 to draw the first and second plates 20,22 together and to pull the first plate 20 against the base plate 36.

Figure 4D:
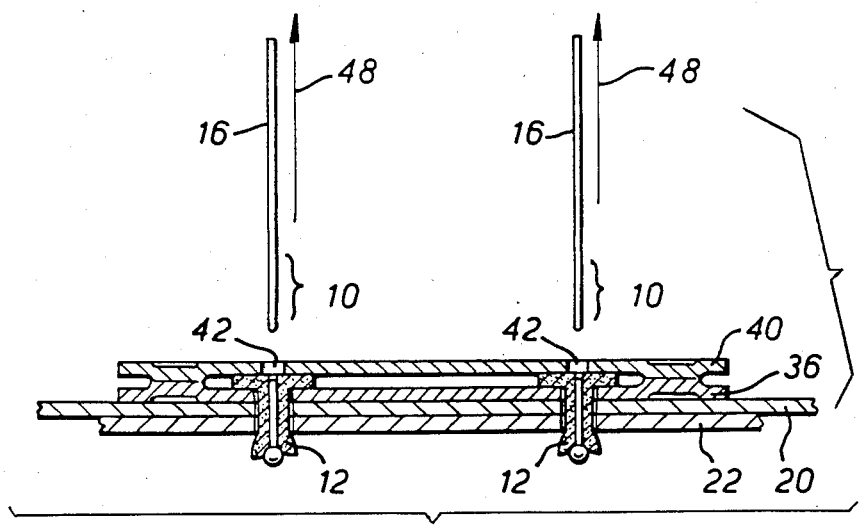

FIG. 4D shows the last stage in the use of the POP rivet assembly according to the present invention. For each POP rivet 10 excess traction in the direction of the second arrow 48 causes the fracture of the traction pins 16 within the bodies of the barrels 12. The combination of the top and base plate 40,36 and the first and second plate 20,22 is thus secured. The top plate 40 presents a small top plate hole 42 for each POP rivet only slightly larger in diameter than the traction pin 16. If it is desired to remove the assembly, it is necessary to drill the top plate 40 out to a diameter at least equal to that of the barrel 12. This is the minimum requirement both for removing the residual portion of the barrel 12 and for being able to insert a subsequent POP rivet to effect a repair. If a new POP rivet is inserted into such a drilled out top plate hole 42 the flange 14 of the replacement POP rivet will lie atop the top plate 40 and immediately be obvious. Similarly, if a drill is employed having a diameter equal to or greater than that of the flange 40 the new POP rivet used in an attempted repair will rest on the base plate 36, but the greatly enlarged diameter of the top plate hole 42 will immediately be apparent. Thus, the assembly shown in FIG. 4D does not permit the removal and replacement of individual POP rivets without such an operation being readily detectable. In order to tamper with such an assembly, it is necessary to have a replacement assembly. It is merely necessary to restrict the availability of such assemblies to ensure security.

FIG. 5 shows an application of the assembly shown in FIG. 4D. A banknote cassette 50 for use by night staff in reloading an autoteller is provided with a POP rivet assembly 52 according to FIG. 4D firstly as a securing means to prevent mechanical forcing of a lock assembly 54. Similarly, a further POP rivet assembly 52 is used for the internal securing of levers (not shown) which permit the opening and closing of doors, giving access to banknotes contained in the cassette 50. While no measure can prevent the mechanical destruction of the banknote cassette to obtain its contents, the POP rivet assembly 52 prevents the fraudulent opening of the cassette 50 without detection.

FIG. 6 shows other configurations which a POP rivet assembly 52 can take. More than two POP rivets 10 can be used in almost any configuration. A circular configuration is also shown having three symmetrically placed POP rivets 10. Any symmetrical assembly 52 can be mounted in any orientation. In the example shown in FIG. 5 it is preferred that the spacing between the pins in each of the instances of use of the POP rivet assembly 52 is different so that any person attempting to disassemble the box and having in his possession a replacement POP rivet assembly will not be able to repair both positions since two or more different types are required. Similarly, in FIG. 6, the spacing may be varied between instances of use making disassembly and repair more difficult.

FIG. 7 lastly shows how a modified top plate 401 may be used with an unsymmetrical array of POP rivets 10 to be mountable only in one predetermined orientation such that a working part 56 of the equipment in which the assembly 52 is to be used is attached to the modified top plate 401 and is always in a correct orientation. The top plate 40 (or 401) and the base plate 36 have hereinbefore been described as being welded together. In order for the present invention to provide the required security it is merely necessary for the top plate 40 and the base plate 36 to be fixed together in such a manner that the top plate 40 cannot be removed from the base plate 36 without physical damage to the top plate 40, visible to the naked eye, being caused to the top plate 40. Thus, any strong adhesive fulfilling this criteria can be employed. Similarly, the material of the top plate 40 and the bottom base plate 36 can be folded together. If one or more folds are tucked beneath the base plate 36 then it is impossible to remove the top plate 40 without damage.

I claim:

1. A rivet assembly comprising: a rivet; a base plate comprising a base plate hole having a diameter at least equal to that of a barrel of said rivet and lesser than that of a flange of said rivet for accepting the through-passage of said barrel of said rivet for said flange to abut said base plate with an inserted portion of said barrel protruberant from said base plate; and a top plate comprising a top plate hole having a diameter at least equal to the diameter of a traction pin of said rivet for the passage therethrough of said traction pin for said top plate to abut said base plate with said flange intermediate therebetween, said top plate thereafter being affixed to said base plate; whereby said assembly is operable to attach together first and second plates by introduction of said protuberant portion of said barrel through first and second aligned holes respectively through-penetrative of said first and second plates and by subsequent extraction and fracture of said traction pin through said top plate hole.

2. An assembly according to claim 1, comprising a plurality of rivets, a corresponding plurality of top plate holes and a corresponding plurality of base plate holes, each one of said plurality of rivets, of said plurality of top plate holes and of said plurality of base plate holes being in a predetermined spaced relationship respectively with each other one of said respective plurality of rivets, said each other one respectively of said respective plurality of top plate holes and of each other one respectively of said respective plurality of base plate holes, for use where said first and second plates comprise a corresponding plurality of aligned pairs of first and second holes in said predetermined spaced relationship.

3. An assembly according to claim 2 where said predetermined spaced relationship is a non-symmetrical relationship such that said assembly is presentable onto said first plate in a single predetermined orientation, said top plate comprising a component for use in the equipment whereof said assembly comprises a part.

4. An assembly according to any one of the preceding claims, wherein said top plate is affixed to said base plate by a process precluding the removal of said top plate from said base plate without the causing of visible damage to said top plate.

5. An assembly according to claim 4 wherein said top plate is affixed to said base plate by welding.

6. An assembly according to claim 5 wherein said welding is electrical spot welding at a plurality of spaced locations.

7. An assembly according to claim 6 wherein said top plate comprises a plurality of bosses for engaging said base plate at said plurality of locations where said spot welding is to take place and for providing separation between said base plate and said top plate for the accommodation therebetween of the thickness of said flange.

8. An assembly according to claim 6 wherein said top plate and said base plate are mutually flexible to provide clearance therebetween for accommodating the thickness of said flange and to touch one another at said plurality of spaced locations where said spot welding is to take place.

9. An assembly according to claim 4 for use in securing a cash box for leaving a visible trace indicative of any attempt at disassembly of said cash box by the removal of rivets and further indicative of any rivets which have been replaced.

10. An assembly according to claim 1 wherein the diameter of said base plate hole is greater than the diameter of said barrel.

11. An assembly according to claim 1 wherein the diameter of said top plate hole is less than the diameter of said barrel.

12. An assembly according to claim 1 wherein the diameter of said top plate hole is greater than that of the traction pin.

13. An assembly according to claim 4 wherein said top plate comprises a plurality of bosses for providing a separation between said base plate and said top plate for the accommodation therebetween of the thickness of said flange.

14. An assembly according to claim 4 wherein said top plate and said base plate are mutually flexible to provide clearance therebetween for accommodating the thickness of said flange.

15. An assembly in accordance with claim 4 wherein said base plate comprises a plurality of bosses for providing a separation between said base plate and said top plate for the accommodation therebetween of the thickness of said flange.

16. An assembly in accordance with claim 1 wherein the barrel of said rivet is elongated to accommodate the thickness of said base plate.

17. An assembly in accordance with claim 4 wherein said top plate is affixed to said base plate by adhesive.

18. An assembly in accordance with claim 4 wherein said top plate and said base plate are folded together.

19. An assembly according to claims 1 or 2 or 3 or 5 or 6 or 7 or 8 or 10 or 11 or 12 or 13 or 14 for use in securing a cash box for leaving a visible trace indicative of any attempt at disassembly of said cash box by the removal of rivets and further indicative of any rivets which have been replaced.

* * * * *